Patented Mar. 12, 1946

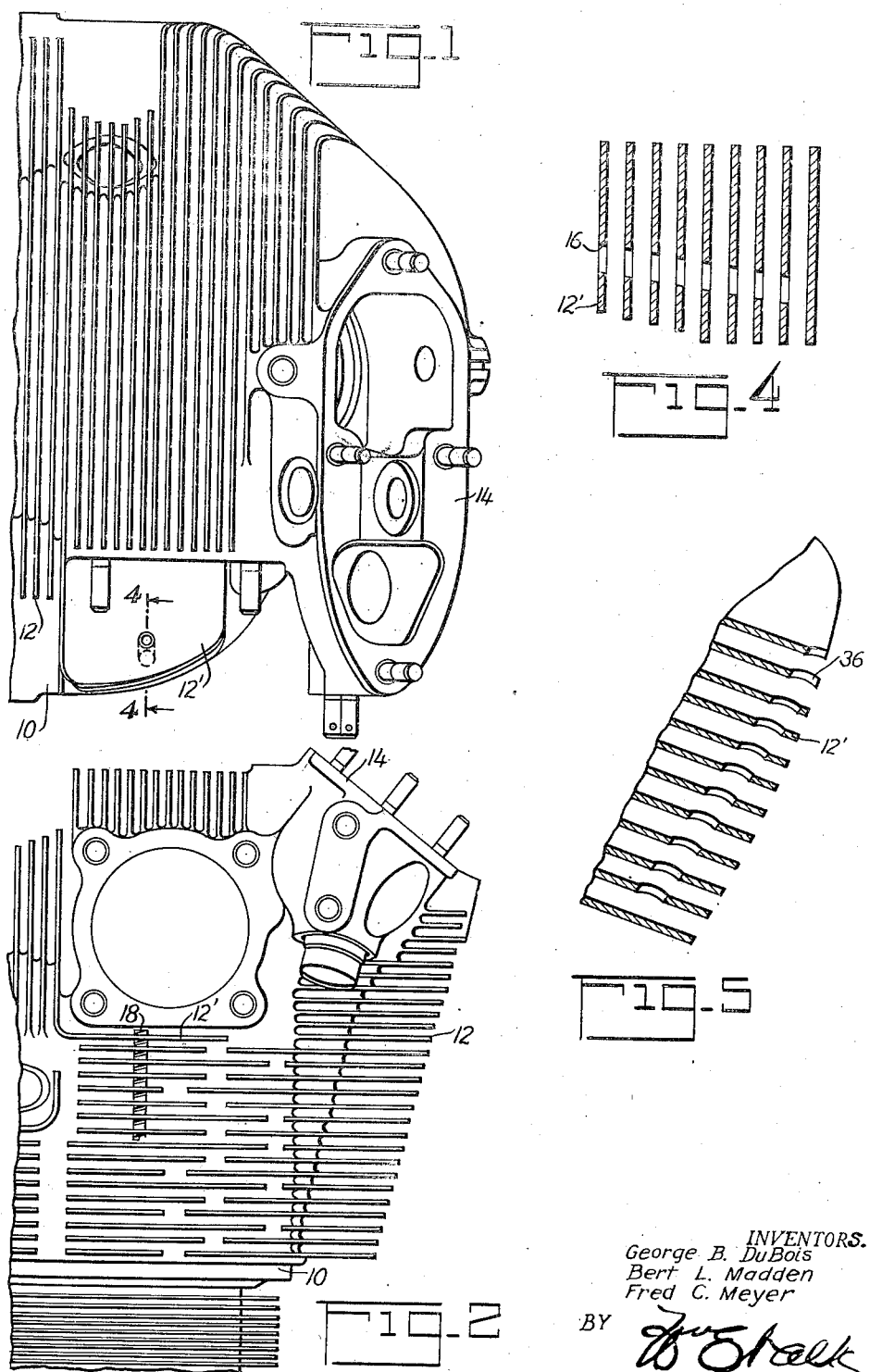

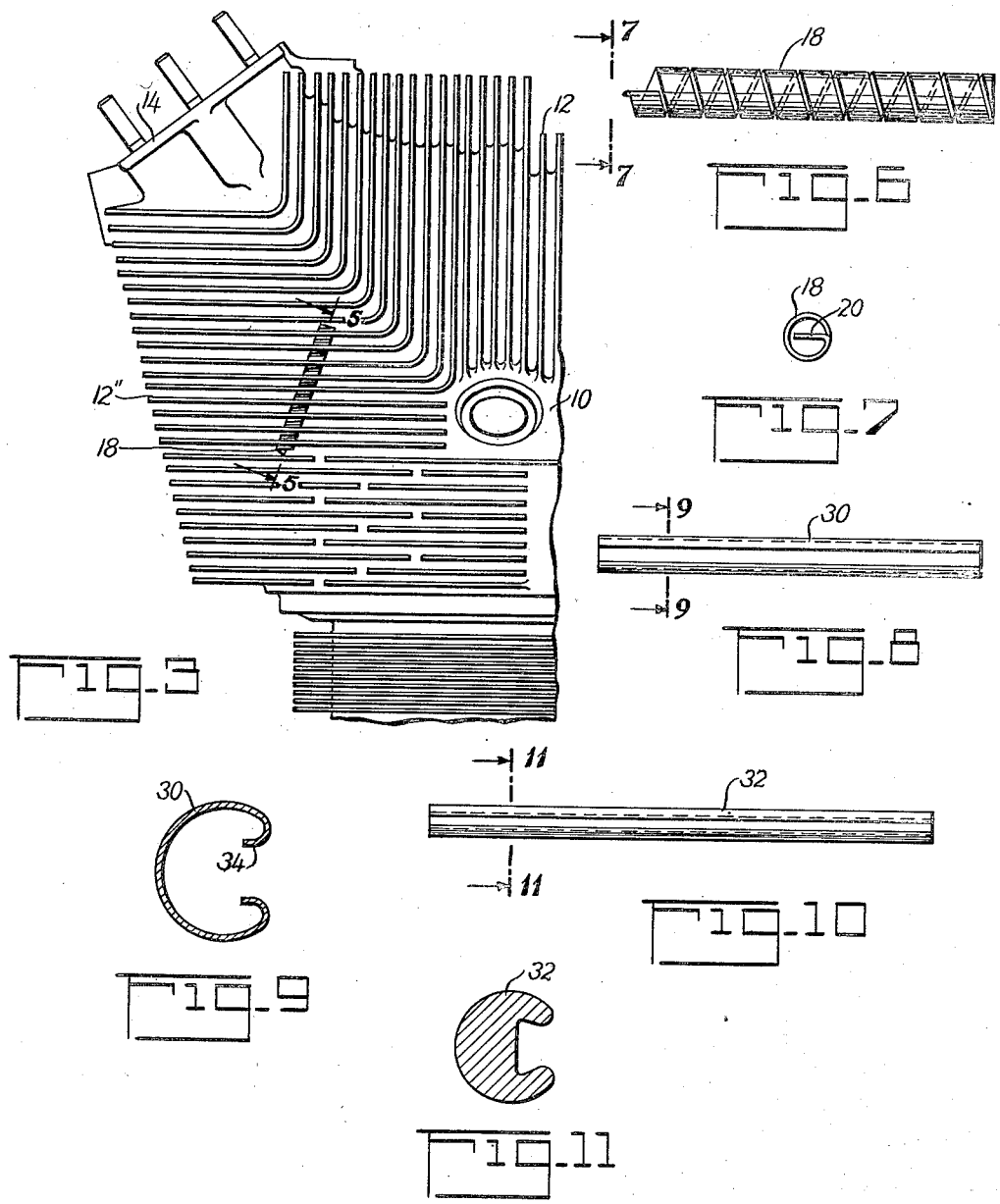

2,396,363

UNITED STATES PATENT OFFICE 2,396,363

FIN VIBRATION DAMPING MEANS

George B. Du Bois, Radburn, N. J., Bert L. Madden, Ithaca, N. Y., and Fred C. Meyer, Wyckoff, N. J., assignors to Wright Aeronautical Corporation, a corporation of New York Application November 6, 1943, Serial No. 509,338

7 Claims. (Cl. 257—261)

This invention relates to a heat radiating cooling fin structure and is particularly directed to the provision of means to inhibit or dampen vibrations of such fin structure.

It is an object of this invention to provide an improved means for preventing vibration of heat radiating cooling fins. In the past it has been the practice to provide means for rigidly interconnecting a group of fins in order to prevent relative movement therebetween. It is an object of this invention to frictionally dampen the vibration of the fins instead of rigidly interconnecting the fins. It is a further object of this invention to provide fin vibration damping means which does not require peening of the fin material in order to hold the vibration damping means in place.

Other objects of this invention will become apparent upon reading the annexed detailed description in connection with the drawings in which:

Fig. 1 is a top plan view of a portion of a cylinder head embodying the invention.

Figs. 2 and 3 are views from opposite sides of Fig. 1,

Fig. 4 is an enlarged sectional view on line 4—4 of Fig. 1 with the vibration damping member removed, Fig. 5 is an enlarged sectional view on line 5—5 of Fig. 3 with the vibration damping member removed, Fig. 6 is a detail view of a fin vibration damping device, Fig. 7 is an end view of the device of Fig. 6 and taken along line 7—7, Fig. 8 is a detail view of a modified fin vibration damping device, Fig. 9 is an enlarged sectional view taken along line 9—9 of Fig. 8, Fig. 10 is a detail view of a tool for use with the device of Figs. 8 and 9, and Fig. 11 is an enlarged sectional view taken along line 11—11 of Fig. 10.

Referring to the drawings, a portion of the cylinder head 10 of an internal combustion engine is provided with the usual heat radiating cooling fins 12 and a valve gear rocker box 14. The fins 12 are disposed about the cylinder head in a manner to facilitate its cooling and, since these fins are quite long and thin, they are subject to considerable vibration which, if unchecked, may result in fin breakage.

In order to inhibit vibrations in a cooling fin structure it has become a practice to provide some sort of fin bracing means for rigidly securing a group of fins together. This construction prevents individual vibration of the fins but still permits the group of fins to vibrate as a unit. In accordance with the present invention, means are provided to frictionally dampen fin vibration. To this end, in order to inhibit vibration of the fins 12', a hole 16 is drilled through these fins inwardly of their outer edge and an outwardly expansible resilient tubular means is inserted into this hole and allowed to expand against the walls of the fin hole.

One form of such tubular means is illustrated in Figs. 6 and 7 and consists of a flat resilient metallic ribbon spirally wound to form a hollow tube 18. This spiral tube is wound so as to have a free diameter slightly greater than that of the hole 16, as determined by the magnitude of the spring stress and friction desired between the tube 18 and the walls of the associated fins. Thus, when the tube is placed within the hole 16, the tube expands against the walls of this fin hole to frictionally engage the associated fins.

In order to insert the spiral tube 18 within the hole 16, it is only necessary to wind up the spiral slightly in order to reduce its outside diameter. For this purpose, the end portion 20 of the spiral ribbon at one end of the tube 18 is bent diametrically across the tube. Accordingly, a suitable tool having a forked end may be inserted through the other end of the tube 18 for engagement with the portion 20 for winding up the spiral of the tube. With the spiral tube 18 tightly fitted within the hole 16 through the group of fins 12', vibration of these fins is effectively dampened by the frictional engagement between the fins and spiral tube.

Instead of using the spiral tube illustrated in Figs. 6 and 7, a split tube 30 of the type illustrated in Figs. 8 and 9 may also be used. The tube 30 is designed to have a free diameter larger than the diameter of the hole 16 through the fins to an extent determined by the spring stress and friction desired between the tube and associated fins. In order to insert the split tube 30, the sides of the tube are held together in order to reduce the tube diameter and the tube is then inserted through the hole 16 in the fins 12' and allowed to expand against the fin walls of this hole. The tube 30 thereupon frictionally engages the fins 12' to dampen possible vibrations of these fins.

A suitable tool for contracting and inserting the split tube 30 is illustrated in Figs. 10 and 11. This tool comprises a solid rod 32 having an outer contour similar to the internal contour of the tube 30 but of slightly smaller cross section. The sides of the tube 30 are squeezed together sufficiently to permit insertion of the tool 32 which thereupon engages the inturned flanges 34 along the split side of the tube to hold the tube in its contracted condition. The tube 30 may be then inserted through the hole 16 in the fins 12' and, when the tool 32 is withdrawn, the tube 30 expands tightly against the walls of the holes in the associated fins.

Instead of using the tool 32, the split tube 30 may simply be driven into the hole 16 in the fins 12'. In order to facilitate this driving operation, one end of the tube 30 should be inwardly tapered.

Fig. 3 discloses an application of the present invention to fins 12" on the other side of the cylinder head and at a point in which it is impossible to drill a hole through the fins from a point spaced inwardly from the outer edge of the fins. Instead, the hole 36 is drilled at an angle from the outer periphery of the fins, as best seen in Fig. 5. Obviously, either the spirally wound tube 18 or the split tube 30 may be inserted within the hole in order to prevent vibration of the associated fins.

From the above description it is apparent that applicants have devised means which frictionally dampens vibration of the associated fins and which may readily be applied to the fins even though the fins are quite irregular in size or shape, as on the cylinder head of an internal combustion engine. Both the helically wound member 18 and the longitudinally split member 30 comprise a tubular member having a slot therethrough extending between the ends of the member whereby the member may be elastically contracted to reduce its diameter in order to permit its insertion within the fin holes in frictional engagement with the walls of said holes. The construction of the present invention also has the advantage in that it requires no peening or stacking of the material of the fin to hold the fin vibration suppressing means in place, as is so common in the prior art constructions. This advantage is particularly important where the fins are cast because of the inherent brittle nature of cast material.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

We claim as our invention:

1. In combination with a heat radiating body comprising a plurality of fins, said fins having a series of axially alined holes therethrough, and means frictionally interconnecting said fins for suppressing vibration of said fins, said means comprising a tubular member extending through said alined holes in sliding frictional engagement with their walls, said tubular member having a slot therethrough and extending between its ends permitting elastic diametrical contraction of said member, and in its non-contracted condition said member having an external diameter greater than the diameter of said holes.

2. In combination with a heat radiating body comprising a plurality of fins, said fins having a series of axially alined circular holes therethrough, and means frictionally interconnecting said fins for suppressing vibration of said fins, said means comprising a tubular member extending through said alined holes in sliding frictional engagement with their walls, said tubular member having slot means substantially co-extensive with its length permitting elastic diametrical contraction of said member, and in its non-contracted condition, said member having an external diameter greater than the diameter of said holes.

3. In combination with a heat radiating body comprising a plurality of fins, said fins having a series of axially alined circular holes therethrough, and means frictionally interconnecting said fins for suppressing vibration of said fins, said means comprising a tubular member extending through said alined holes in sliding frictional engagement with their walls, said tubular member having a helical slot therethrough and extending between the ends of said member to permit elastic diametrical contraction of said member, and in its non-contracted condition said member having an external diameter greater than the diameter of said holes.

4. In combination with a heat radiating body comprising a plurality of fins, said fins having a series of axially alined circular holes therethrough, and means frictionally interconnecting said fins for suppressing vibration of said fins, said means comprising a tubular member extending through said alined holes in sliding frictional engagement with their walls, said tubular member having a longitudinal slot therethrough and extending between the ends of said member to permit elastic diametrical contraction of said member, and in its non-contracted condition said member having a diameter greater than the diameter of said holes.

5. In combination with a heat radiating body comprising a plurality of fins, said fins having a series of axially alined holes therethrough, and means for suppressing vibration of said fins, said means comprising a flat resilient ribbon spirally wound to form a tubular element, said tubular element extending through said alined holes in frictional engagement with their walls.

6. In combination with a heat-radiating body having a plurality of fins extending therefrom, said fins having a series of axially-alined holes therethrough, and means frictionally interconnecting said fins for suppressing vibration of said fins, said means comprising a tubular member extending through said alined holes in sliding frictional engagement with the walls of said holes, said tubular member having a slot substantially co-extensive with the length of said member to permit elastic diametrical contraction of said member.

7. In combination with a heat-radiating body having a plurality of fins extending therefrom, said fins having a series of alined holes extending therethrough, and means for suppressing vibration of said fins, said means comprising a helically-wound tubular member extending through said alined holes in frictional engagement with their walls.

GEORGE B. DU BOIS.
BERT L. MADDEN.
FRED C. MEYER.